United States Patent [19]

Kull et al.

[11] 4,293,806

[45] Oct. 6, 1981

[54] SINGLE AND MULTICYCLE CONTROL DEVICE FOR ELECTRIC MOTORS

[76] Inventors: Leo Kull, 58 Westover Ave., West Caldwell, N.J. 07006; Vello H. Ebrok, 376 Prospect St., East Orange, N.J. 07017

[21] Appl. No.: 40,720

[22] Filed: May 21, 1979

[51] Int. Cl.[3] .............................................. G05B 11/14

[52] U.S. Cl. .................................... 318/673; 318/672; 318/466; 318/470; 318/549; 318/557

[58] Field of Search ............... 318/466, 470, 672, 673, 318/557, 549; 307/141, 141.4

[56] References Cited

U.S. PATENT DOCUMENTS

| | | | |
|---|---|---|---|
| 2,467,944 | 4/1949 | Munson | 318/470 |
| 3,395,323 | 7/1968 | Peters | 318/673 |
| 3,919,613 | 11/1975 | Steinmann | 318/DIG. 2 |
| 3,938,016 | 2/1976 | Lange et al. | 318/673 |

*Primary Examiner*—Stanley J. Witkowski
*Assistant Examiner*—Eugene S. Indyk

[57] ABSTRACT

A cycle control device employing a parallel switching circuit to control a single or a predetermined number of cycles of a motor driven output shaft. A latching and a cycle switch in the parallel circuit are providing an overlapping switching sequence which is initiated by a latchable pushbutton and controlled further by the motor driven output shaft to the end of the cycle. An indexing arrangement is functioning to delay the unlatching and keeping the motor circuit energized until the unlatching and motor stopping can take place in a home position after a dial readable predetermined number of ratcheting steps have been completed. The control principle is applicable to a countdown version, a memory version with an automatic return or to a unit with a shaft mechanism to one or the other mode.

16 Claims, 21 Drawing Figures

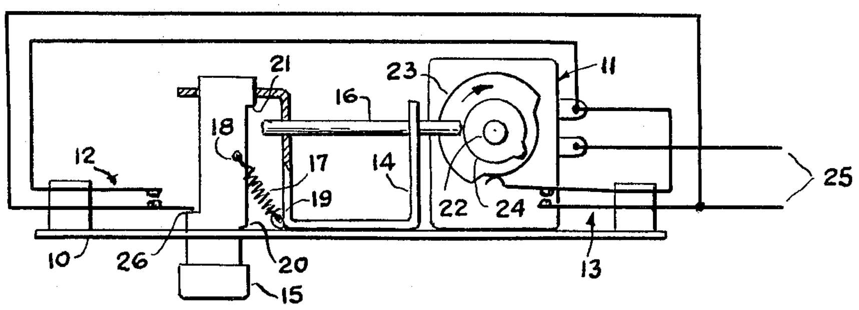
FIG 1
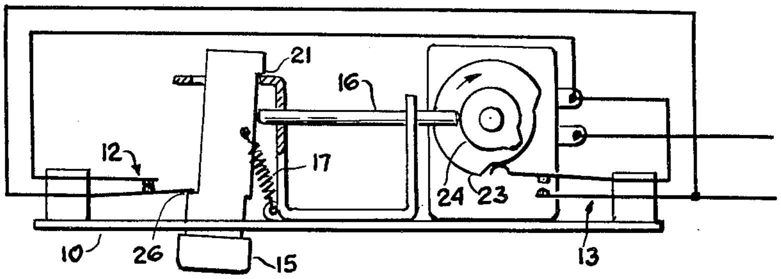
FIG 2
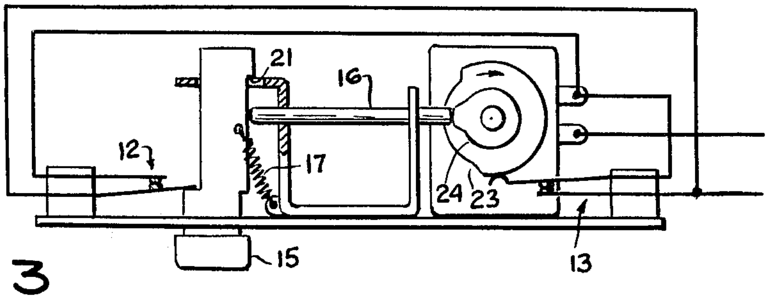
FIG 3
FIG 4
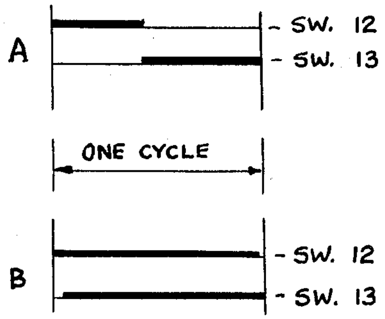
FIG 5
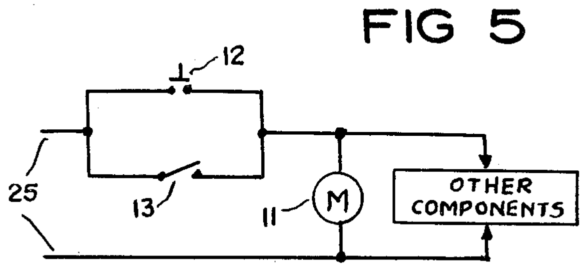

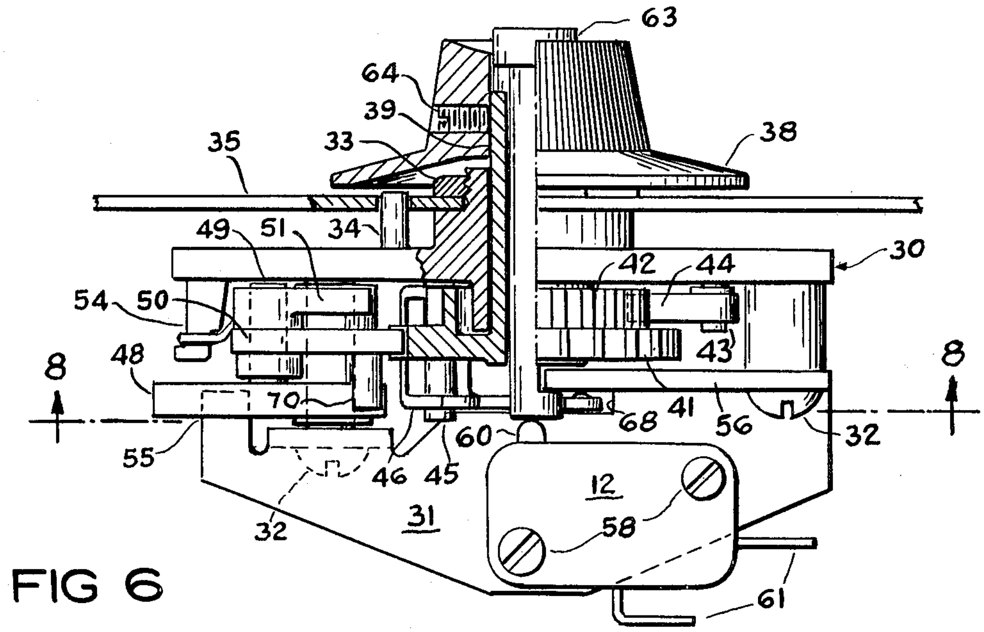
FIG 6
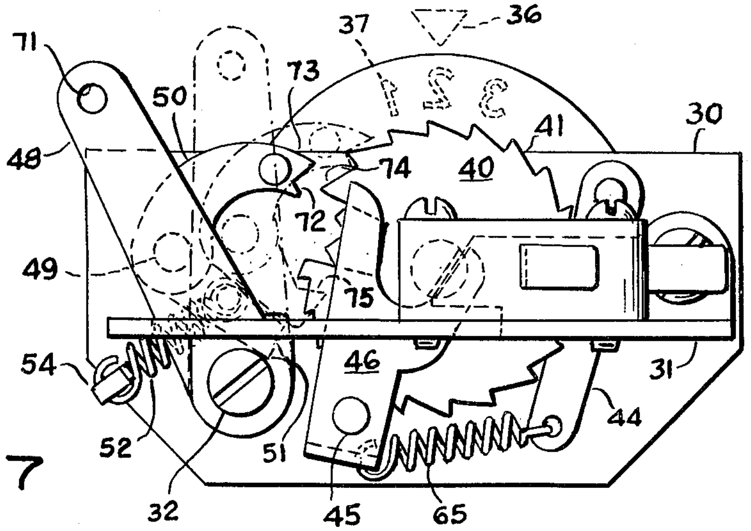
FIG 7
FIG 8
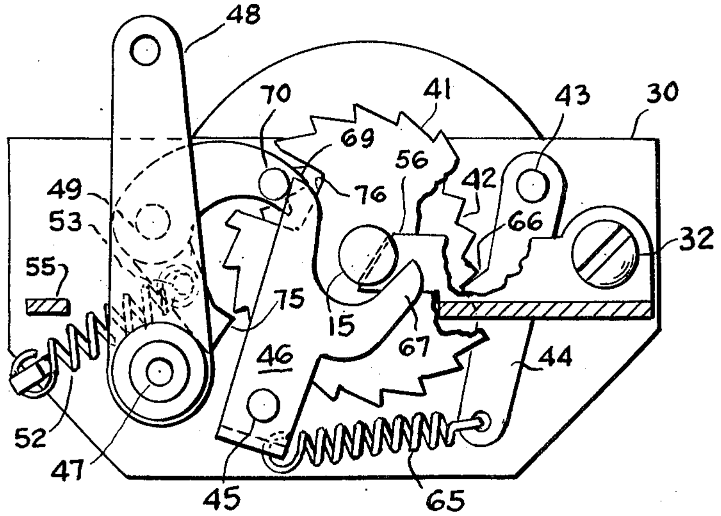
FIG 9
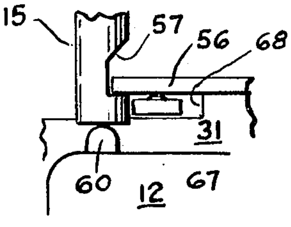
FIG 10
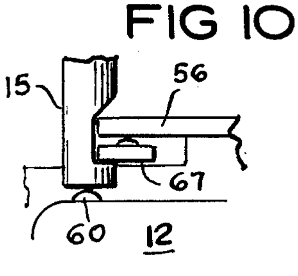

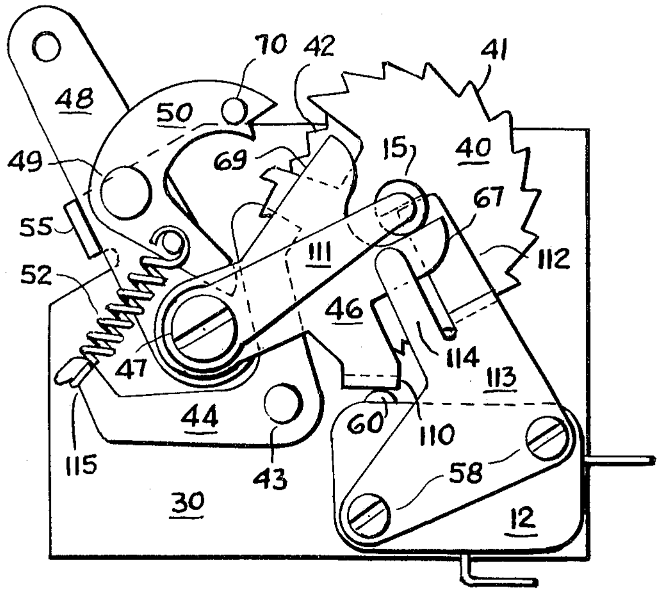
FIG 17
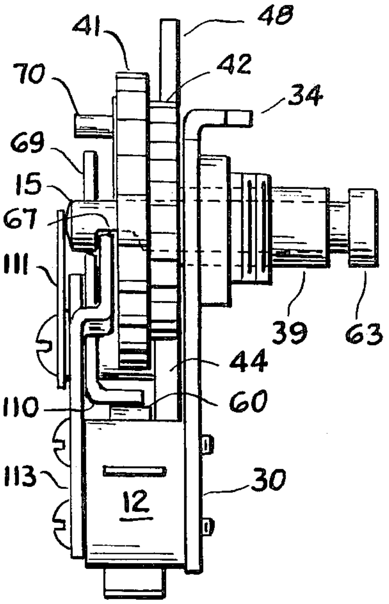
FIG 18
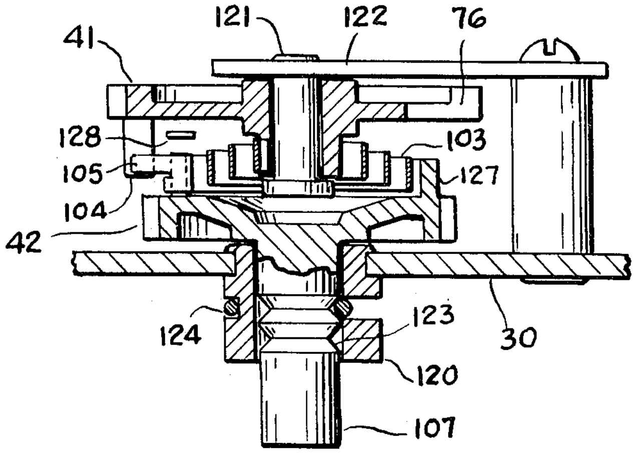
FIG 19
FIG 20
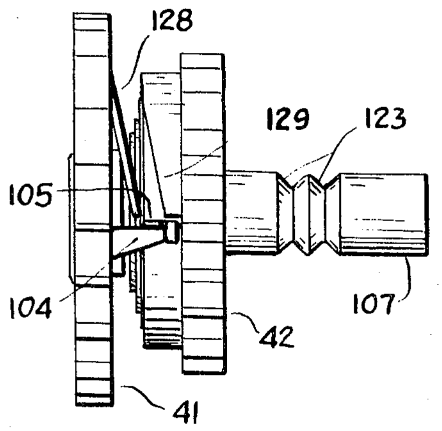
FIG 21
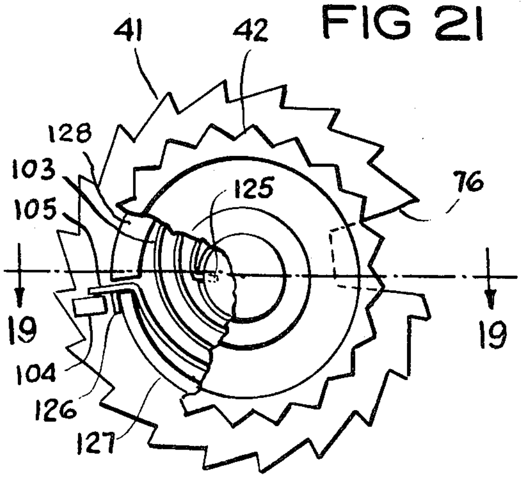

SINGLE AND MULTICYCLE CONTROL DEVICE FOR ELECTRIC MOTORS

BACKGROUND OF THE INVENTION

This invention relates to electromechanical control devices for controlling a single or a multiple predetermined number of cycles of an electric motor driven output shaft. The field of applications where a single or a multicycle control is required can include a variety of electric motor driven and cycle controlled devices where each cycle will trigger a sequence of motions which in turn will accomplish a desired action to produce a product, deliver an item or material from a storage, launch a wanted performance etc.

In the prior art of cycle control methods a combination of standard control components like relays, latching devices, electronic controls etc. are in wide use. The multicycle controls further include wellknown machine elements like detent positioned indicating or readout means, ratcheting or indexing mechanisms and electrical switching means for cycle start and termination.

Though various known combinations and methods can lead to the same end result, preference is given to an arrangement which can offer compactness, simplicity and flexibility of acting as a single cycle control or a multicycle unit in a countdown or a memory version.

SUMMARY OF THE INVENTION

In the present invention the cycling of an electric motor driven output shaft is controlled by a parallel switching circuit where a latching arrangement to control one of the two switches in the parallel circuit forms the bases of the single cycle control which can function independently or as part of the multicycle control unit. The two motions required to control the latching mechanism, which provides a bistable switching mode, are a cycle start motion which usually is provided by a manually operated pushbutton and an unlatching motion which can be viewed as a feedback motion generated by the output shaft of the electric motor.

In the multicycle version a detent positioned indexing or ratcheting member with readout means is added to function as a countdown device which in a basic sense delays or prevents the occurence of the unlatching action as used in the single cycle control, until the home position of the indexable member is reached. As a distinctive difference over the prior art, the feedback motion is performing a dual function: it is permitted to act directly as the unlatching motion in the home position and it is restricted to act as an indexing motion in any preset position other than the home position. This dual motion principle leads to an indicating or dial arrangement which eliminates the need for a "0" position. Consequently the home position will read "1" and only the single cycle control mechanism is functioning in this position.

While various indexing or ratcheting mechanisms are applicable here, the ratcheting principle which is disclosed in U.S. Pat. No. 3,848,564, issued Nov. 19, 1974 to Leo Kull, is proving to be the most suitable one because a specially shaped ratchet pawl can readily act as a driver for a ratchet wheel and take a different path for triggering the unlatching action in the home position which is permitted by a missing ratchet tooth.

The countdown version is easily convertible to a memory version where the ratchet wheel is separated from the setting wheel but it is still acting as a delay means to the unlatching action and it is provided with a spring return for repeat action.

Thus one of the objects of the invention is to provide a cycle control method with two switches and a latching action which can be used independently as a single cycle control device or as part of a multicycle control version.

Another object is to provide a multicycle control device with a dual purpose actuating or feedback motion selectively permitted to act as a countdown motion or an unlatching motion in a home position of the indexing wheel.

A more specific object is to provide a specially shaped dual purpose ratchet pawl to act as an indexing driver and an unlatching actuator in the home position.

Another object in a different version is to provide an unlatching means responsive to the position of an indexing member for controlling the unlatching action.

A further object is to provide additional means to convert a countdown version to a memory type multicycle unit.

A general object of the invention is to provide a new basic control principle which can offer a number of different application versions with a relative simplicity, compactness, flexibility and economy.

These and other objects and advantages will become apparent from the following specification of the illustrated preferred versions of few embodiments shown in the accompanying drawings of which:

FIGS. 1-3 are schematic illustrations of the electrical and mechanical control elements of a single cycle control in three different positions;

FIG. 4 is illustrating two extreme timing relationships of the two control switches;

FIG. 5 is a basic wiring diagram for a single or multicycle control unit;

FIG. 6 is a partly sectional view of a countdown version;

FIG. 7 is a rear view of FIG. 6;

FIG. 8 is a section taken along the line 8—8 of FIG. 6;

FIGS. 9 and 10 show the latcing mechanism in two different positions;

FIGS. 17 and 18 are the rear and side views of a modified countdown version;

FIG. 19 is a sectional detail view of a dual mode detent and ratchetwheel arrangement partly taken along the line 19—19 of FIG. 21;

FIGS. 20 and 21 are side and bottom views of the wheels as shown in FIG. 19.

SINGLE CYCLE CONTROL

Figure 11:
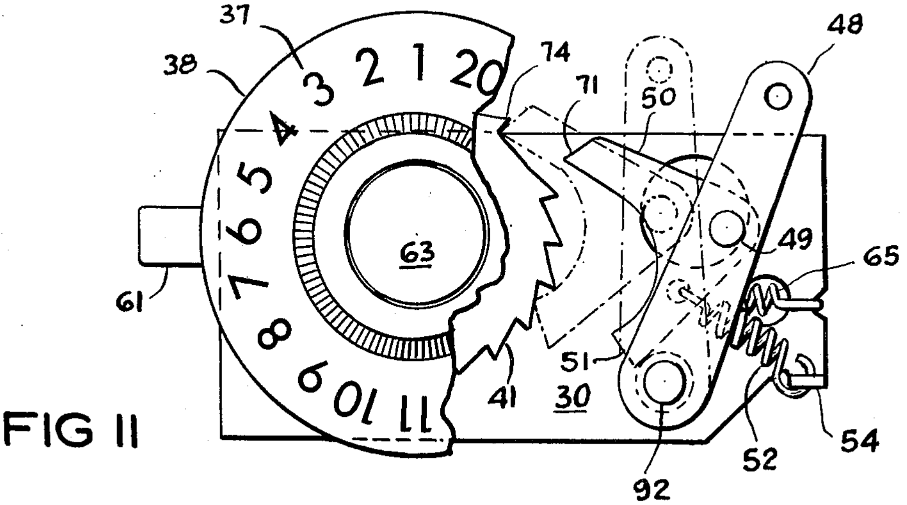
FIGS. 11-13 are partially sectional or fragmentary front, side and rear views of a modified countdown unit.

FIGS. 1-3 are illustrating the basic principle of a single cycle control which can be used independently or as a part of a multicycle control as will be described later. The partly schematic illustration in FIG. 1 includes a baseplate 10 which mounts an electric motor 11, a latching or starting switch 12, a cycle switch 13 and a bracket 14 to give support for a mechanical latching mechanism which can have a number of entirely different looking arrangements. The basic elements of the latching mechanism, as they are shown only for illustrative purposes, are a pushbutton 15, slidably guided in slots of basesplate 10 and bracket 14, and an actuator rod 16 also having a slidable mounting in guideholes of bracket 14.

Pushbutton 15 has a return spring 17 anchored to a hole 18 and to an ear 19 of bracket 14. It further has a step 20 acting as a stop, another step 26 in an insulating contact with the moving leaf of the switch 12 and a third step 21 acting as a simple latching means over the guideslot corner of bracket 14 when the pushbutton is depressed as shown in FIG. 2.

Motor 11 has an output shaft 22 driven through a speed reduction gear. Shaft 22 is rotating a cycle cam 23 in a clockwise direction which is capable of opening and closing the contacts of the cycle switch 13. Shaft 22 is also providing an actuating motion to rod 16 by means of another cam 24, mounted next to cam 23. The motor 11 is receiving its power from a suitable power line 25 trough switches 12 and 13 which have a parallel connection on one side of the powerline 25 as shown in FIG. 5. FIG. 1 is illustrating a standby position where both switches 12 and 13 are in an open position. Pressing now the button 15 will close the latch or start switch 12 and the angular application of the return spring 17 will also pull the step 21 to the right into a latched-in position as shown in FIG. 2. The motor 11 will start then the rotation of cams 23 and 24 and next in sequence will be the closure of cycle switch 13 by cam 23. Now both switches are closed and right after this the opening of switch 12 can take place which is accomplished by the unlatching action triggered by cam 24 and push-rod 16 to pushbutton 15 as shown in FIG. 3. Since step 21 no longer holds pushbutton 15, the spring 17 can pull it back to its standby position (FIG. 1) and open the blades of switch 12. The motor 11 will be energized now only through the cycle switch 13 and its running will continue until cam 23 lets the blades of switch 13 open.

The switch 12 is shown to be operable by the push-in motion of button 15, but it is obvious that a second motion is always part of a latching action which can be used to operate the switch 12 with the same end result. In FIG. 2 this could be the horizontal motion of button 15 next to latching corner 21.

FIG. 4 illustrates two extreme timing conditions in which FIG. 4-A shows the minimum overlap as a "make before break" condition which is also the illustrated relationship of cams 23 an 24. FIG. 4-B shows the maximum overlap condition as the other extreme of the timing relationship. Any in-between overlap of these extremes placed anywhere within the cycle will give exactly the same end result and leads to a comfortable design flexibility for choosing this timing relationship. Since at least one of the switches 12 or 13 is always closed, it is obvious that these switches can control other components in a machine (FIG. 5) which have to be energized during full or part of the cycle.

it is also understood that cams 23 and 24 serve the simplest illustrative purpose only and any cycling member or motion can replace cam 23 for closing the switch 13 before the unlatching of switch 12 takes place. Similarly, the purpose of cam 24 is to provide an unlatching pulse to pushbutton 15 and the action of rod 16 could be viewed also as an actuating motion or feedback motion triggered by the motor 11 during its cycle. A variety of well-known mechanical means are applicable here like a crankpin, various cams, linkages or cable connections.

If the control device is used where hydraulic or pneumatic power is available, appropriate actuating means, triggered again by the output shaft 22, could be used. Also, electrical remote control means like solenoids or electromagnets could conveniently provide the unlatching pulse.

COUNTDOWN TYPE MULTICYCLE CONTROL

The single cycle control, just described, is applicable to a multicycle control which in addition to the latching mechanism includes indexing and readout means to delay the unlatching action until a preset number of cycles will be "count down".

FIGS. 6-10 illustrate a mechanism where pushbutton 15 and switch 12, in a basic sense, are functioning the same way as previously described. All the components are supported and retained by a molded basemember 30 and a sheetmetal bracket 31 which are tied together by two screws 32. The unit is provided with a nut 33 and keying pin 34 for a direct mounting to a panel 35 which can have an indicating pointer 36 related to the readout figures 37 on a dial knob 38. Base 30 has a bearing hole to rotatably receive the hollow shaft 39 of an indexing wheel 40 which has ratchet teeth 41 and detent teeth 42 next to each other. Base 30 further has a pivot stud 43 for a detent arm 44, another pivot stud 45 for a latch lever 46 and a pivot stud 47 for an actuating lever 48 and screw 32. Lever 48 can be also a molded part with a stud 49 pivotally receiving a pawl 50 which has an arm 51 resting against the pivot stud 47 or hub of lever 48 when a tension spring 52 is hooked between a stud 53 of arm 51 and an anchoring hook 54 of base 30. A tab 55 of bracket 31 acts as a stop for arm 48 and thus the spring 52 has a double purpose to keep the lever 48 and pawl 50 in a position as shown in FIG. 7.

All the moving parts are trapped after the bracket 31 is assembled by two screws 32. A bentover portion 56 is retaining the indexing wheel 40 and the pushbutton 15 which has a notch 57 cut to its end (FIG. 9). The switching means are represented in this unit by a snapaction switch 12 which is mounted to the bracket 31 by means of two screws 58 and which has an outwardly springbiased operating button 60 in contact with pushbutton 15. A pair of normally open switch terminals 61 can be connected to the control circuitry of FIG. 1 or 5 as previously described. The pushbutton 15, which can freely slide in the hollow shaft 39, has a manually operable button head 63 slightly smaller in diameter than the shaft 39 and consequently the dialknob 38 can be assembled over the button 63 and fastened with a setscrew 64 to shaft 39. The springforce of switch button 60 or contact blades, if they are used instead, is sufficient to return the button 15 but an extra return spring could be added if desired.

The latchlever 46 has a tension spring 65 giving to it a counterclockwise bias and the same spring is hooked to the end of the detent lever 44 which has a tooth 66 designed to match the teeth of detent wheel 42 for a proper detent action. An arm 67 of latchlever 46, extending through a slot 68, is acting in conjunction with the pushbutton 15 to provide a latching action controlled by the motions of pushbutton 15 and another arm 69 of iever 46 if it is contacted by a pin 70 of pawl 50.

The mechanism thus far described can provide the single cycle control exactly the way as was shown in FIG. 1 if electrically connected to motor 11 and if the motion of camshaft 22 is connected to the actuating lever 48 or to its hole 71 in any convenient way to provide the required actuating motion. Referring now to the standby position of FIG. 9, it is easy to see that the depression of pushbutton 15 will close the terminals 61 and trigger the latching action of arm 67 which will retain the depressed position of pushbutton 15 as seen in FIGS. 7 and 10. Now the motor is started and the feedback or actuating motion given to the actuator 48 will be transmitted to lever arm 67 by the pin 70 of pawl 50 resulting to the unlatching action as shown in FIG. 8.

The principle of multicycle control in this invention means a countdown ratcheting or indexing from a preset figure toward a home position for the purpose of providing a delay to the unlatching action just described. In FIG. 6 the dial 38, ratchet wheel 41 and detent wheel 42 all have 20 divisions or teeth and are manually rotatable in both directions whereby the detent wheel 42 and its lever 44 are acting to maintain a set position and readout alignment of pointer 36 to indicate a desired number of cycles the motorshaft 22 has to complete. While the detent wheel has a full number of 20 teeth, the ratchet wheel 41 has a tooth missing in the home position permitting the end of pawl 50 to enter and provide the unlatching operation as described before. Pawl 50 has a special bifurcated end where tip 72 will act as the end of an ordinary ratchet pawl while the other tip 73 is necessary only when the last tooth 74 before home position is contacted as will happen on the next stroke in FIG. 7 when the dial 38 is driven from position "2" to position "1".

The arm 51 of pawl 50 is shown to act on same level as detent wheel 42 and its tip 75 is shaped to come in contact with the teeth of detent wheel 42 on the end of the actuating stroke as shown in dotted lines in FIG. 7. This will prevent any inertial overshooting to the indexing wheel 40 which can be a problem if the actuator 48 is operated rapidly by a spring action or by an electrical actuator such as a solenoid. If the actuation is a relatively slow motion generated by a crankpin on shaft 22 for instance, there is no need for this overshooting prevention feature.

Since the arrangement in FIGS. 6-8 can function without stops to limit the rotation of dial 38, there are some comparative advantages like setting the dial in both directions which permits reaching the high counts the shortest way and placement of 1 and 20 next to each other which permits the use of largest dial numerals for a given dial diameter.

As mentioned before, the home position will always read "1" and the single cycle unlatching in this position can take place as shown in FIG. 8. For a count of 3 cycles, for instance, the dial 38 has to be moved 2 steps out of the home position and the 3 cycle control then means two countdown ratcheting steps (the dotted line position in FIG. 7 shows the completion of the first ratcheting step in this case) and the unlatching action triggered by the feedback motion during the third cycle. Thus the required number of setting and countdown increments is always one less than the number of counted cycles and there is no need for a confusing "0" position as found in some of the existing devices.

A slightly rearranged version of the mechanism just described is shown in FIGS. 17 and 18 to illustrate the flexibility of applying the basic principle for a "flat design requirement". The knob 38 is not shown here and it is to be undestood that any knob shape can be conveniently attached to shaft 39.

The main difference here is the mounting of switch 12 directly to base plate 30 which is shown to be a sheetmetal part. The switch button 60 in this version is normally depressed by an ear 110 of latchlever 46 which has a common pivot 47 with the actuating lever 48. The pivot post 47 further is providing a screw mount to a flat spring 111 which is acting as a return spring for the pushbutton 15 which in turn is retained by an offset arm 112 of a retaining plate 113. Another arm 114 of plate 113, which is mounted by switch screws 58 to base 30, is providing a proper guidance to the latch arm 67 of lever 46. The detent lever 44, pivoting at 43, has a somewhat different shape with an arm 115 providing a hooking point for the spring 52. The latter has now a triple function acting as a detent spring, return spring to lever 48 which rests against stop 55 and the spring to pawl 50 as described before.

When the button 15 is depressed now, the springbiased switch button 60 will force the arm 67 of latchlever 46 to notch 67 providing the latching and switching action thereby. The unlatching can take place again in home position when pin 70 of pawl 50 is contacting arm 69. It is understandable that more than one switch can be stacked up and operated by latchlever 46 if an application requires it.

MODIFIED MULTICYCLE CONTROL UNIT

Figure 12:
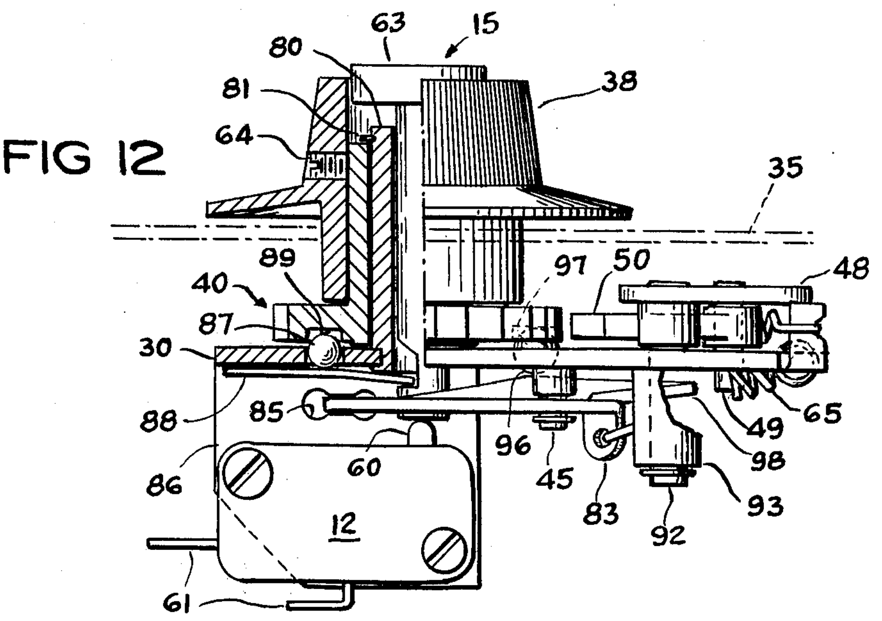
Figure 13:
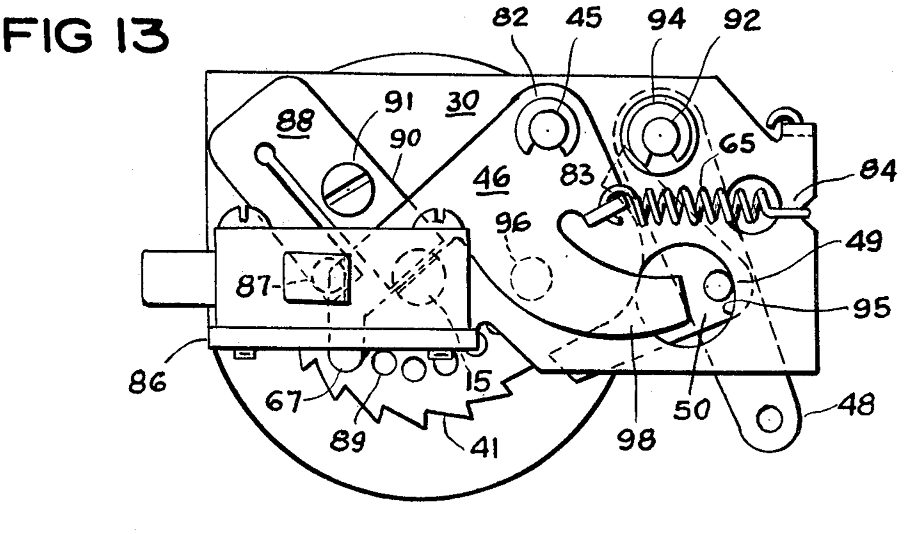
Figure 14:
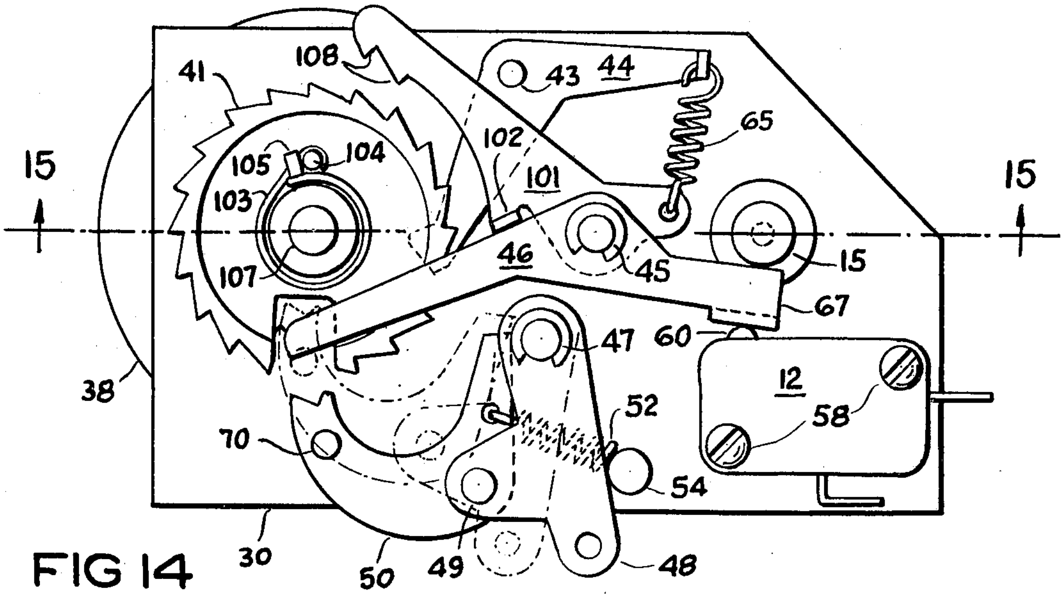
FIGS. 14 and 16 are the rear views of a memory type version in two different positions.

FIGS. 11-13 illustrate a modified version of the countdown control device which employs exactly the same basic control principle and basic functional elements just described and therefore same reference numerals are used again for same or corresponding parts. Certain details are shown purposely different to illustrate the flexibility of the basic principle.

A single base member 30 is used here as a sheetmetal part having three supporting members with retaining rings for pivotal or rotational support. Bushing 80 with its retaining ring 81 mounts rotatably the indexing wheel 40 with dial knob 38 fastened to it by a set screw 64 again. The pushbutton 15 is shown to have a larger diameter head 63 which could have a compression spring as an extra return force in addition to switch button 60. Latchlever 46 is pivotally mounted to a stud 45 and retained by a retaining ring 82 in a way allowing some lateral motion in addition to its pivotal motion. The tension spring 65 is angularly hooked between a bentover ear 83 and an anchoring point 84 formed by a notch and a hole. Latchlever 46 has the latcharm 67 guided in a slot 85 in a bentover portion 86 of base 30 which also mounts the switch 12.

The detent action in this version is provided by a widely used ball and spring method where a ball 87 is retained loosely in a guidehole of base 30 and spring biased by a flat spring 88 toward mating detent seats 89 equalling the number of dial divisions and ratchet teeth of wheel 41. Spring 88 has a bifurcated shape and has its other leg 90 mounted to the base 30 by a screw 91 so it can act also as a retainer to pushbutton 15 similarly to the bentover portion 56 to FIG. 8.

The actuating lever 48 has a shoulder stud 92 pivoting in a bushing 93 of base plate 30 and retained by a ring 94. It further has the pin 49 fastened to it to provide a pivotal mount to the pawl 50 which in this version has a somewhat simpler shape because it is not used to transmit the unlatching motion to the latchlever 46. Pawl 50 has the tension spring 52 hooked to it similarly to the previous version where pin 49 extends through a hole 95 and acts as a limit stop. The pawl 50 has its arm 51 resting against the stud 92 which keeps the operating pawl tip 71 clear from the ratchet teeth of wheel 41. The latter has again a missing tooth next to the tooth 74 but not deeply cut as in previous version.

The unlatching action in home position and the prevention of it in this version is controlled by a ball 96 which has a seat 97 in wheel 40 similar to seats for ball 87 but on a different diameter so the single seat 97 for ball 96 is active only in home position letting an arm 98 of latchlever 46, as biased by spring 65, to move toward plate 30 as shown in FIG. 12. Now the motion of pin 49 of actuator 48 can contact the latchlever 46 during its stroke and perform same unlatching operation as previously described while the ratchet pawl 50 is riding on the missing tooth without a drive step to the ratchet wheel 41. In any other preset multicycle position the ball 96 will be cammed out from its seat 97 and the arm 98 will be kept away from the base plate 30 preventing its contact with pin 49 and thus delaying the unlatching section until the dial 38 is driven to its home or "1" position. Then the ball 96 will meet its seat 97 but the unlatching will again take place during next stroke after the "1" position is reached without a need for a "0" position.

MEMORY TYPE MULTYCYCLE CONTROL

In the countdown versions so far described the index wheel 40 together with dial 38 will be ratcheted to their home position and then the unlatching and stopping of cycling can take place. For many applications, especially the ones where a different multicount is set for each case, this is desirable. For some other applications the nature of operation could be more repetitive like in copy machines for instance where same number of copies is required from a number of originals. Then it is more convenient to set the dial once and use only the pushbutton 15 to start a new cycle count.

The versions previously described are convertible to a memory type unit but FIGS. 14–17 are illustrating a somewhat different arrangement which incorporates all the features of FIGS. 6–7 with the main difference that the pushbutton 15 is not concentric with dial 38. Base member 30 is shown to be a molded plastic part which mounts most of the components previously described. The latch arm 67 of latchlever 46, pivoting on stud 45, is coacting with pushbutton 15 which has an annular groove 100 to act as a latching shoulder. One end of spring 65 again is providing the detenting force to lever 44 while the other end of spring 65 is providing the springforce to latchlever 46 through a backup pawl 101 which is also pivoting on stud 45 and which has a lug 102 in contact with lever 46.

If button 15 is depressed now, the spring 65 will cause lever arm 67 to move into groove 100 providing a simultaneous latching and operation of switch 12. The movement of lever 48 and pawl 50 to position shown in dotted lines in FIG. 14 will trigger the unlatching action as previously described.

The memory type action of this invention means an automatic reset to the initial set position at the end of each multicycle count when the unlatching takes place. To accomplish this, the ratchet wheel 41 and detent wheel 42 are separated but held together by a torsion spring 103 which has one looped end anchored to a pin 104 of ratchet wheel 41 and the other looped end to a pin 105 which is also securing a retaining sleeve 106 to a shaft 107 which in turn is secured to the detent wheel 42 and which has also the dialknob 38 fastened to it by means of the setscrew 64. Spring 103 has a pretension to keep pins 104 and 105 together but allows a relative rotation of the ratchet wheel 41 in a clockwise direction one dial increment less than a full revolution. The dial 38 is still free to set in both directions against the detent action of lever 44 and wheel 41.

Figure 16:
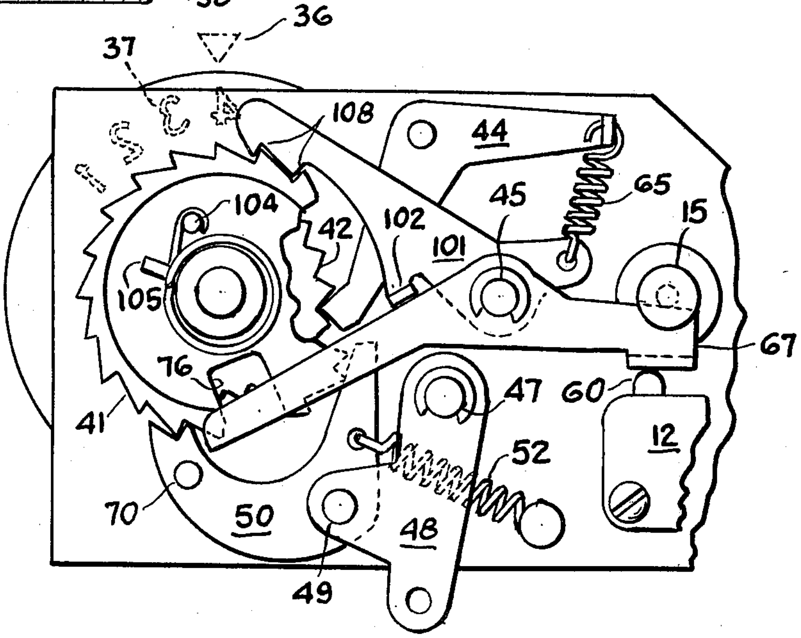

Suppose now the dial 38 is set to a count "4" as shown in FIG. 16 and button 15 is depressed against a return spring 107, the latching action and cycle start will take place and in same time two teeth 108 of the backup pawl 101 come into engagement with the teeth of the ratchet wheel 41. Now the wheel 41 can be ratcheted in a clockwise direction (FIG. 16) by pawl 50 against the spring 103, provided that the spring 103 is lighter than the detent hold. The double teeth 108 of backup pawl 101 are necessary only to provide a hold when the notch 76 of wheel 41 is passing the holding zone.

In FIG. 16 the wheel 41 is on the end of the second operating stroke of lever 48 and pins 104 and 105 are two increments apart. The third operating stroke or cycle will drive the pin 104 and the ratchet wheel 41 to their home position and then the next or fourth cycle can perform the unlatching operation (dotted lines in FIG. 14) which will also move the backup pawl 101 to its free position and spring 103 can start to return the wheel 41. This, however, cannot take place until pawl 50 has returned and then wheel 41 is completely free to rotate in the counterclockwise direction until pins 104 and 105 are meeting again. Since the wheel 41 can be a light freely moving plastic part, the spring 103 can be relatively light and consequently the inertial forces when pins are hitting each other during return stroke will not cause any danger to overcome the detent hold.

The separation of wheels 41 and 42, application of spring 103 and pawl 101 thus permits the countdown action toward the home position to the internal only and the setting of the count is done automatically by spring 103 at the end of every multicycle count. The dial 38 can still function conveniently without stops, but stops could be always added between base 30 and dial 38 or detent wheel 42.

Since the countdown and memory type operations have their advantages and disadvantages, only the nature of operation will determine which is better suited for a particular application. In some applications a switchover mechanism to one or the other mode is desirable. In practical terms this means the addition of a shift control to the memory version just described which will function as a coupling mechanism for wheels 41 and 42 for the purpose of converting the operation to a countdown unit again.

FIGS. 19–21 are illustrating one of the possible engagement methods where only the engagement details are shown. The concentric ratchet wheel 41 and detent wheel 42 have separate rotatable mounting means where a bushing 120, secured to baseplate 30, mounts shaft 107 of wheel 42 and a stud 121, secured to a bridgeplate 122 is mounting the ratchet wheel 41. Shaft 107 has two grooves 123 and the bushing 120 has a groove and a slot arrangement for a U-shape wire spring 124 which provides a two-position detent arrangement for shaft 107 and its wheel 42.

Figure 15:
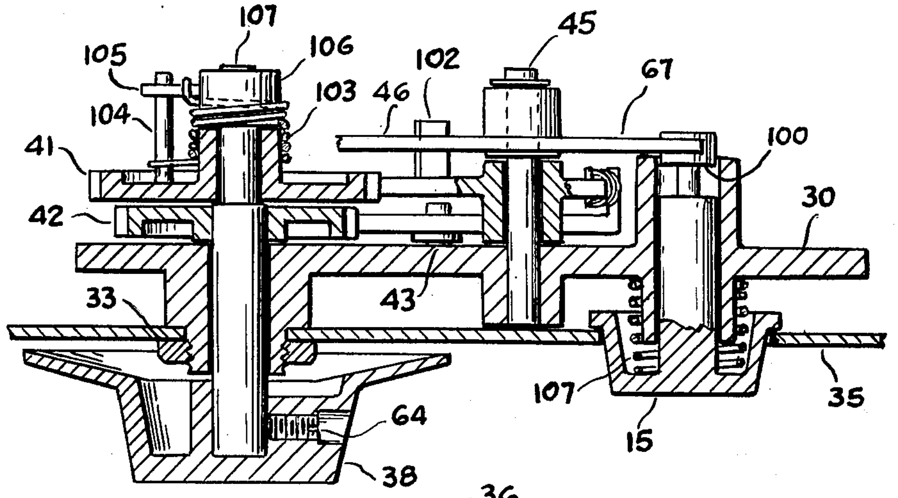
FIG. 15 is a section taken along the line 15—15 of FIG. 14.

As compared to FIG. 15, the spring 103 here is shown to be a flat spiral spring resembling a main or hair spring as found in clock movements. The inner end of spring 103 has a bentover portion 125 for hooking it to the hub of wheel 41 and the outer end has a loop 126 fitting to a slot of an annular ring 127 of wheel 42. The loop end 126 is bifurcated and half of this end has only a L-shape bend to act as a stop 105 against another stop pin 104 of wheel 104. Thus the arrangement provides basically the same spring coupling between wheels 41 and 42 as shown in FIG. 15.

If now the shaft 107 is pushed in, the detent spring 124 will snap to the other groove 123 and an engagement of wheels 41 and 42 is accomplished by a pawl 128 which comes in contact with the end 126 of spring 103. If wheels are aligned, this engagement will take place instantly, but if the wheel 41 is ratcheted out of alignment, the flexing pawl 128 will complete its engagement as soon the home position is reached. A relief slope 129 is provided to make this engagement possible.

Though the shaft 107 and stud 121 are shown solid, they could be made hollow to permit a concentric arrangement for the pushbutton 15 which works best for the arrangements of FIGS. 6 and 17 while the version in FIG. 12 is not so suitable for a memory unit because the friction of the springloaded ball 96 has to be overcome by the resetting spring 103.

SUMMARY

Besides the illustrated versions of the basic control principle, one, skilled in the art, can envision numerous other variations with an entirely different look. The dial 38, for instance, is limited only by a practical number of divisions and any other known rotary or straightline indicating method like a pointer on a stationary dial, figures readable through a window etc. could be employed here.

While the operation without stops seems to be most desirable, stops and empty spaces between the lowest and highest dial figures can be always added. An empty dial space with proper marking could be used for "continuous operation" if another missing ratchet tooth without the unlatching provision is added.

The actuator 48 could have many different shapes to suit various applications. This can include a straightline motion approximation to the arc drawn by point 49 which operates the pawl 50. While the cycle control with motor controlled feedback motion is the most common application of the invention, the actuator 48 could receive its pulsing from other sources like a time based oscillation and then the unit could function as an incremental interval timer where the dial figures will read seconds, minutes etc.

As mentioned before, a latching and switching flexibility exists where both latching motions are usable to operate any number of open or closed switching devices which means that the multicycle units of this invention do not have to be necessarily linked to the single cycle control circuitry as previously described. The 3-dimensional latching action where pushbutton 15 and latchlever 46 are moving on different planes can be easily replaced by a one plane latching mechanism if an application permits or requires it.

Various other modifications in addition to the illustrated and described versions are possible and obvious to the ones skilled in the art and therefore the invention is to be limited only by the scope of the following claims.

We claim:

1. A cycle control device for controlling the rotation of an electric motor driven output shaft comprising:

a parallel switching circuit for energizing said electric motor, said circuit having normally open first and second switching means in each branch of said circuit, a latchable actuating means for closing and maintaining the closure of said first switching means for starting the rotation of said output shaft, an actuating means controlled by the motion generated by said output shaft, said actuating by means closing said second switching means before the opening of said first switching means and thereafter opening said second switching means to terminate the rotation of said output shaft, and a feedback means actuated by the rotation of said output shaft, said feedback means unlatching said latchable actuating means leading to an opening of said first switching means.

2. A cycle control device of claim 1 wherein said feedback is a mechanical motion.

3. A cycle control device of claim 1 further including means to delay said unlatching by a predetermined number of motor rotations, said delay means including an indexable member having a home position and a number of preselectable positions bearing indicia, said feedback means being responsive to said home position and to the preselectable positions where said feedback means is restricted to perform an indexing action toward said home position where said unlatching is permitted to take place after the predetermined number of motor rotations have been completed.

4. A cycle control device of claim 3 wherein said indexablemember has ratchet teeth and further including a ratchet pawl actuated by said feedback means, said ratchet pawl having means to advance said indexable member toward said home position, said indexable member having a missing tooth in said home position preventing a further advancement of said indexable member and allowing said ratchet pawl to follow a different path for triggering said unlatching.

5. A cycle control device of claim 3 wherein said indexable member has ratchet teeth and further including an actuator operable by said feedback motion, said actuator operating a ratchet pawl for advancing said indexable member toward said home position, said indexable member having a missing tooth in said home position for preventing a further advancement of said indexable member and means for permitting an engagement of said actuator and an unlatching member after said indexable member is driven to said home position, said engagement letting said actuator to trigger said unlatching.

6. An electrical switching device for controlling the rotation of an electric motor driven output shaft comprising:

an indexable member having a home position and N number of indicia bearing preselectable positions for controlling a maximum number of N+1 rotations of said output shaft, detent means for yieldably retaining said indexable member in any of said preselectable positions, a latching mechanism having a latching and unlatching motion wherein these motions provide a bistable switching action to an electrical switching means for controlling the starting of said electric motor, a feedback means actuated by said electric motor for operating an actuating means, said actuating means by responsive to said home position and to said preselectable positions of said indexable member, said home position permitting said actuating menas to perform said unlatching and said switching action of said electrical switching means, said preselectable positions dictating said actuating means to step said indexable member toward said home position, the number of said indexing steps plus one being the number of rotations said output shaft is permitted to turn.

7. An electrical switching device of claim 6 wherein said indexable member is a ratchet wheel with a missing tooth in said home position and further including a ratchet pawl for driving said ratchet wheel toward said home position, said missing tooth preventing any further advancement of said ratchet wheel and said missing tooth permitting said ratchet pawl to follow a different path for contacting and moving said latching means to a position allowing said unlatching and said switching action.

8. An electrical switching device of claim 7 wherein said ratchet pawl has a pivoting engagement with said actuating means, said pawl having a driving arm and a spring arm for maintaining a standby position when a spring force is applied between said pivot point and a resting point of said spring arm; said driving arm of said ratchet pawl in said standby position clearing the teeth of said ratchet wheel allowing a two-directional rotational setting to said ratchet wheel.

9. An electrical switching device of claim 8 wherein said driving arm of said pawl has a bifurcated end to allow an entrance into a notch created by said missing tooth in said home position, wherein said bifurcated end prmits an engagement with the last tooth of said ratchet wheel before said home position is reached, said entrance into said notch of said ratchet wheel in said home position permitting an engagement with said latching means to perform said unlatching action.

10. An electrical switching device of claim 9 wherein said detent means is a detent wheel with a spring biased detent pawl and said spring arm of said ratchet pawl having a shape for coming in contact with teeth on said detent wheel when driving said ratchet wheel towards said home position to prevent an inertial overshooting of said indexable member.

11. An electrical switching device of claim 6 wherein said indexable member is a ratchet wheel with a missing tooth in said home position and said actuating means operates a ratchet pawl for driving said ratchet wheel toward said home position, said missing tooth preventing any further advancement to said ratchet wheel, said ratchet pawl being responsive to the home position of said ratchet wheel for permitting an engagement between said actuator and said latching means for performing said unlatching.

12. An electrical switching device of claim 11 wherein said ratchet wheel is mounted on a base member which is freely supporting a ball, said ball acting between said ratchet wheel and said latching means, said latching means having a spring bias against said ball and ratchet wheel, said ratchet wheel having a seat for said ball in said home position, said seat permitting said ball and said latching means move to a different level where it comes into engagement with said actuating means to perform said unlatching.

13. An electrical switching device of claim 6 wherein said indexable member is a ratchet wheel with a hollow shaft and said latching mechanism comprises a spring biased pushbutton sliding inside said hollow shaft to provide said switching action and a spring biased latching member moving at right angles to said pushbutton to provide said latching action.

14. An electrical switching device of claim 13 wherein said pushbutton has a latching shoulder formed by a notch, said latching shoulder coacting with said latching member to provide said latching.

15. An electrical switching device of claim 6 wherein said indexable member is a ratcheting arrangement and said switching action of said latching mechanism is given by a manually operable pushbutton and said unlatching motion is provided by a latchlever, said latchlever coacting with said pushbutton and being actuated by said feedback means.

16. An electrical switching device of claim 6 wherein said indexable member comprises a ratcheting member and a settable member, said settable member including said detent means, said ratcheting member and said settable member having rotational freedom with respect to each other in one direction against a coupling spring, said moving freedom being restricted in the other direction by motion limiting means mounted on said ratcheting member and on said settable member, said coupling spring being anchored between said ratcheting member and said settable member to keep said motion limiting means together in a standby position, said ratcheting member having a drive pawl operable by said actuating means and a spring biased backup pawl controlled by said latching means allowing its engagement to said ratcheting means whenever said starting motion is given to said latching mechanism, said backup pawl permitting a ratcheting action toward said home position against said coupling spring, said unlatching motion in said home position causing said switching action and a disengagement of said backup pawl, said disengagement permitting a return of said ratcheting member, the extent of said return being controlled by said motion limiting means and being proportional to the number of said indexing steps, said return providing an automatic resetting to said ratcheting member without rotation of said setting member.

* * * * *